(12) United States Patent
Natsuhara et al.

(10) Patent No.: US 6,737,779 B2
(45) Date of Patent: May 18, 2004

(54) COMMUTATOR MOTOR

(75) Inventors: Tsutomu Natsuhara, Inukami-gun (JP); Tomio Yamada, Higashiazai-gun (JP)

(73) Assignee: Matsushita Electric Works, Ltd., Kadoma (JP)

(*) Notice: Subject to any disclaimer, the term of this patent is extended or adjusted under 35 U.S.C. 154(b) by 0 days.

(21) Appl. No.: 09/926,500

(22) PCT Filed: Mar. 13, 2001

(86) PCT No.: PCT/JP01/01946

§ 371 (c)(1),
(2), (4) Date: Nov. 13, 2001

(87) PCT Pub. No.: WO01/69763

PCT Pub. Date: Sep. 20, 2001

(65) Prior Publication Data

US 2003/0057788 A1 Mar. 27, 2003

(30) Foreign Application Priority Data

Mar. 14, 2000 (JP) ......................................... 2000-071139

(51) Int. Cl.[7] ............................................... H03K 23/26
(52) U.S. Cl. ........................ 310/136; 310/198; 310/233
(58) Field of Search ................................ 310/133–137, 310/173, 179, 233, 140–142, 220, 198, 206, 181, 71; H02K 23/26, 23/36

(56) References Cited

U.S. PATENT DOCUMENTS

| 2,660,681 A | * | 11/1953 | Horne | 310/198 |
| 3,525,912 A | * | 8/1970 | Wallin | 318/17 |
| 4,296,344 A | * | 10/1981 | Rabe | 310/184 |
| 4,329,610 A | * | 5/1982 | Klein | 310/220 |
| 5,747,910 A | * | 5/1998 | Haner | 310/180 |

FOREIGN PATENT DOCUMENTS

| DE | 828 885 | | 1/1952 | | |
| DE | 23 40 500 | | 3/1975 | | |
| DE | 32 33 015 | | 3/1984 | | |
| DE | 37 23 369 | | 11/1988 | | |
| JP | 54-47016 | * | 4/1979 | ......... | H02K/23/36 |
| JP | 54-477016 | * | 7/1979 | ......... | H02K/23/64 |
| JP | 5785563 | * | 11/1980 | ......... | H02K/23/26 |
| JP | 57-85563 | | 5/1982 | | |
| JP | 63-194540 | | 8/1988 | | |
| JP | 6-335214 | | 12/1994 | | |
| JP | 63-19450 | * | 11/1998 | ......... | H02K/23/64 |
| JP | 11-89201 | | 3/1999 | | |

* cited by examiner

*Primary Examiner*—Burton S. Mullins
*Assistant Examiner*—Karen Beth Addison
(74) *Attorney, Agent, or Firm*—Oblon, Spivak, McClelland, Maier & Neustadt, P.C.

(57) ABSTRACT

A commutator motor having excellent performance of preventing coils from being burnt at overload can operate from either AC or DC power sources. This commutator comprises an iron core having plural slots, a rotation shaft inserted in a center of the iron core, and a pair of first and second commutators mounted on the rotation shaft at opposite ends of the iron core. A first coil wire is connected to the first commutator, and is wound on bottoms of the slots to form an inner coil. A second coil wire having a smaller diameter than the first coil wire is connected to the second commutator, and is wound on the inner coil in the slots to form an outer coil.

4 Claims, 4 Drawing Sheets

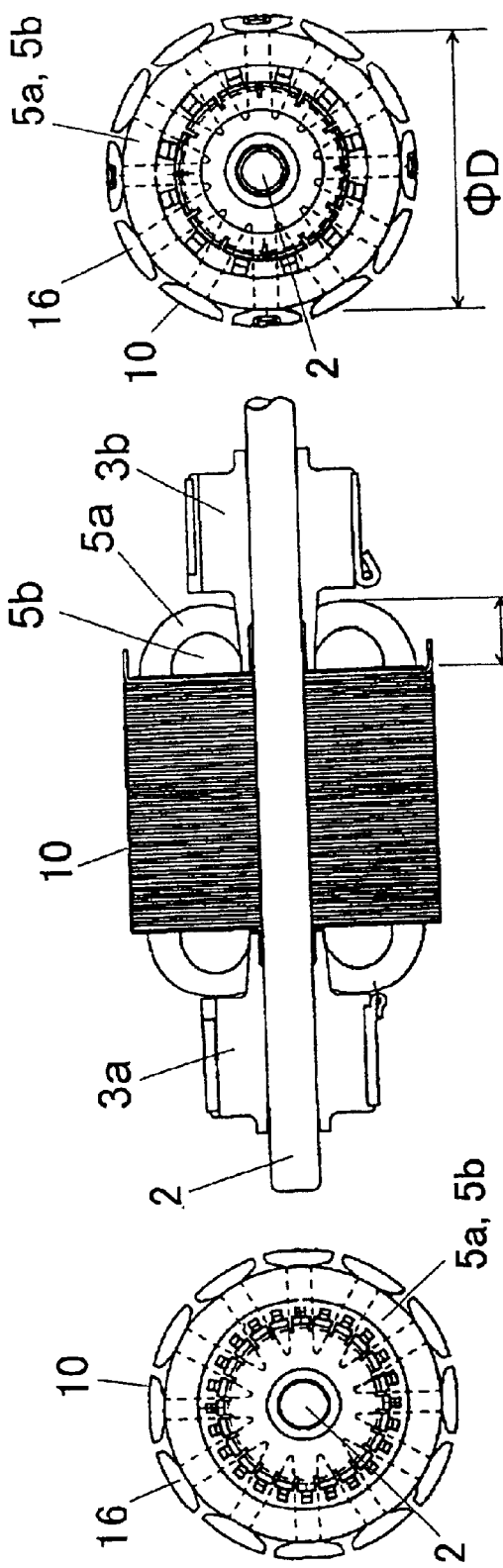

COMMUTATOR MOTOR

TECHNICAL FIELD

The present invention relates to a commutator motor that is available to vacuum cleaners, electric power tools and so on, and particularly the commutator motor that can operate from either AC or DC power sources, and has excellent performance of preventing coils from being burnt at overload.

BACKGROUND ART

In recent years, the need for commutator motors that are used in electric appliances such as vacuum cleaners, electric power tools and so on, and can operate from either AC commercial power source or a DC power source such as battery, is increasing.

For example, Japanese Patent Early Publication [KOKAI] No. 6-335214 discloses a commutator motor with a two-layer structure of coil windings for low and high voltages that are wound in iron-core slots of a rotator. When the commutator motor is operated from a 12 V rechargeable battery, a switch makes a connection between the battery and a brush for low voltage, so that electric current is allowed to flow in order of battery—brush for low voltage—commutator for low voltage—coil windings for low voltage—commutator for low voltage—brush for low voltage—battery. Thus, the commutator motor can be operated by use of the low voltage.

On the other hand, when the commutator motor is operated from 100 V AC power supply, the switch makes a connection between a brush for high voltage and the 100 V power source, so that electric current is allowed to flow in order of 100 V power source—full-wave rectification—brush for high voltage—commutator for high voltage—coil windings for high voltage commutator for high voltage—brush for high voltage—full-wave rectification—100 V power source. Thus, the commutator motor can be also operated by use of the high voltage.

By the way, in the commutator motor mentioned above, the coil windings for high voltage used in the connection with the 100 V AC power source are provided at the bottom side of the iron-core slots, and the coil windings for low voltage used in connection with the battery are provided at the top side of the iron-core slots, i.e., at the outside of the coil windings for high voltage. Due to this structure, when the commutator motor is operated by use of the 100 V AC power source, a cooling efficiency of the coil windings for high voltage provided at the bottom side of the iron-core slots becomes poor. Consequently, an increase in temperature of the coil windings easily occurs, and there is a fear that the coil wires are burnt at overload.

SUMMARY OF THE INVENTION

Therefore, a concern of the present invention is to provide a commutator motor, which can operate from either AC or DC power sources, shows an equal motor characteristic in both cases of using the AC and DC power sources, and has excellent performance of preventing coils from being burnt at overload.

That is, the commutator motor comprises an iron core having plural slots that are used for coil winding, a rotation shaft inserted in a center of the iron core, and a pair of first and second commutators mounted on the rotation shaft at opposite ends of the iron core. A first coil wire is connected to the first commutator, and wound on bottoms of the slots of the iron core to form an inner coil. A second coil wire is connected to the second commutator, and wound on the inner coil in the slots of the iron core to form an outer coil. In addition, the commutator motor is provided with a first terminal that can be connected to a first power source to supply electric power of the first power source to the first coil wire through the first commutator; and a second terminal that can be connected to a second power source to supply electric power of the second power source to the second coil wire through the second commutator. In the present invention, the commutator motor is characterized in that a diameter of the second coil wire is smaller than that of the first coil wire.

Since the outer coil formed by use of the second coil wire having the small diameter is disposed at the peripheral side of the iron core, it is possible to efficiently cool the second coil wire in order to prevent the second coil wire from being burnt at overload. In particular, when a cooling unit such as cooling fans for cooling the second coil wire is arranged around the outer coil, the cooling efficiency of the second coil wire can be facilitated to provide a further improvement of safety. Thus, in the present invention, it is possible to provide the commutator motor with a high degree of reliability in safety by preventing the second coil wire from being burnt.

In the commutator motor of the present invention, it is preferred that a winding start position of the second coil wire of the outer coil is displaced at 90 degrees about the iron core with respect to a winding end position of the first coil wire of the inner coil. In this case, it is effective to minimize the occurrence of waste space between the first and second coils formed by use of the coil wires having different diameters, and to downsize the commutator motor.

In addition, in the commutator motor described above, it is preferred that the first terminal is adapted for use in a DC power source for supplying a large current that works as the first power source, and the second terminal is adapted for use in an AC power source for supplying a small current that works as the second power source, and the inner and outer coils are formed such that a motor output provided by use of the first power source is substantially equivalent to the motor output provided by use of the second power source.

Further features and advantages of the present invention will be clearly understood from the best mode for carrying out the invention described below referring to the attached drawings.

BRIEF DESCRIPTION OF THE DRAWINGS

FIGS. 5A to 5C are a first end view, side view and a second end view of the commutator motor of the present invention, respectively.

BEST MODE FOR CARRYING OUT THE INVENTION

Referring to the attached drawings, a commutator motor according to an embodiment of the present invention is explained in detail.

Figure 1:
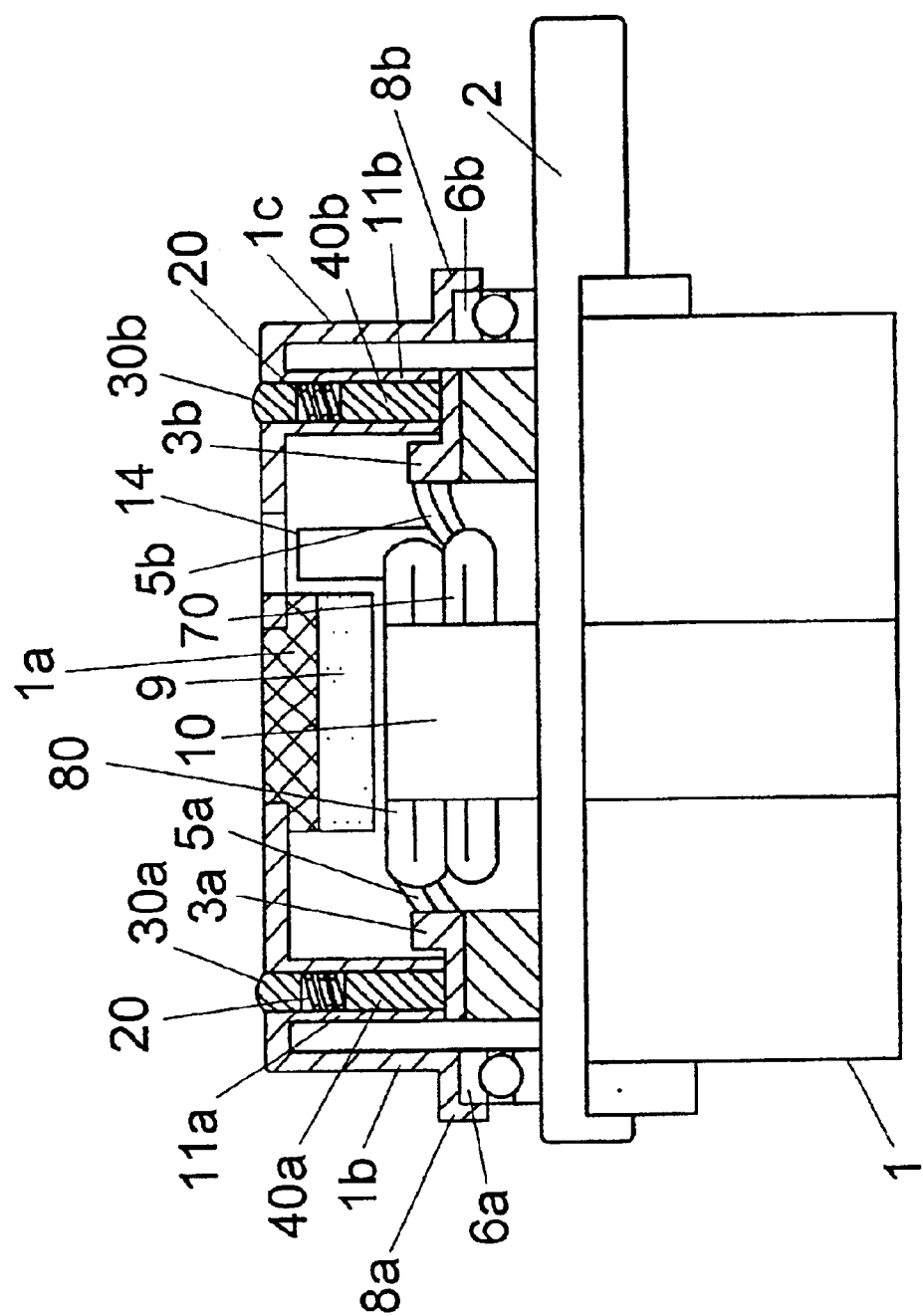
FIG. 1 is a schematic cross-sectional view of a commutator motor according to an embodiment of the present invention.

As shown in FIG. 1, a rotation shaft 2 of the commutator motor of the present invention is housed in a motor case 1, and inserted into an iron core 10 that is a component of a rotor. Commutators 3a, 3b are mounted on the rotation shaft 2 at opposite ends of the iron core 10. A coil wire 5b is connected at its one end to the commutator 3b, and wound in slots 12 of the iron core 10 to form an inner coil 70. In addition, a coil wire 5a is connected at its one end to the commutator 3a, and wound on the inner coil 70 in the slots 12 of the iron core 10 to form an outer coil 80.

The motor case 1 is composed of a case body 1a, and bearing stages 1b, 1c. A field magnet 9 is disposed on an inner surface of the case body 1a. The bearing stages 1b, 1c respectively have bearing holders 8a, 8b. The rotor with the iron core 10 and the rotation shaft 2 is rotatably supported by bearings 6a, 6b on the bearing holders 8a, 8b of the motor case 1. There is a required clearance between the field magnet 9 disposed on the inner surface of the motor case 1 and the iron core 10. The filed magnet 9 can be secured to the motor case 1 by use of an adhesive.

A brush (40a, 40b) such as a carbon brush is placed on the outer surface of each of the commutators 3a, 3b. A supply of electric power from outside is performed by allowing the brush to contact the corresponding commutator. The motor case 1 has brush holders 11a, 11b, in which each of the brushes 40a, 40b is slidably supported. In addition, a spring 20 is disposed in each of the brush holders 11a, 11b so as to provide a spring bias in a direction of pressing the brush (40a, 40b) against the commutator (3a, 3b).

In FIG. 1, the numerals 30a, 30b respectively designate first and second terminals supported in the brush holders 11a, 11b, each of which is exposed at its one end to the outside of the motor case 1 and contacts the spring 20 at the other end. For example, the first terminal 30a is used when the commutator motor is operated by supplying a full-wave rectified DC electric power from an AC power source (AC 100V) such as commercial power source through the commutator 3a. On the other hand, the second terminal 30b is used when the commutator motor is operated by supplying an electric power from a DC power source (approximately DC 12V) such as a battery through the commutator 3b. The numeral 14 designates a cooling fan for cooling the outer coil 80, which operates when the iron core 10 rotates.

As shown in FIGS. 2A to 2F, the inner coil 70 of the commutator motor of the present embodiment is obtained by winding the coil wire 5b in the slots 12 of the iron core 10. That is, in this embodiment, the iron core has twelve teeth 16 formed every 30 degrees in its circumferential direction. Each of the slots 12 is defined between adjacent teeth 16. To facilitate understanding, the tooth 16 shown at the 12 o'clock position is named as a first tooth, and the remaining teeth are named as a second tooth, third tooth . . . and a twelfth tooth in a counterclockwise direction. On the other hand, with respect to the slots 12, the slot defined between the first and second teeth is named as a first slot, and the remaining slots are named as a second slot, third slot . . . and a twelfth slot in the counterclockwise direction.

Figure 2A:
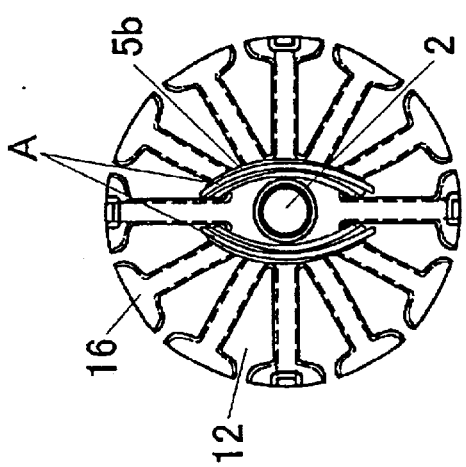
FIGS. 2A to 2F are schematic plan views illustrating a method of forming an inner coil of the commutator motor.

First, as shown in FIG. 2A, the coil wire 5b is wound so as to extend between the first slot and the sixth slot, and between the seventh slot and the twelfth slot. This winding operation is repeated four times to obtain a symmetrical coil pair A on the iron core 10 (FIG. 2A). In this coil pair A, a total number of turns of the coil wire is 8 (4 turns between the slots). The position of the coil pair A corresponds to a winding start position of the coil wire 5b.

Figure 2B:
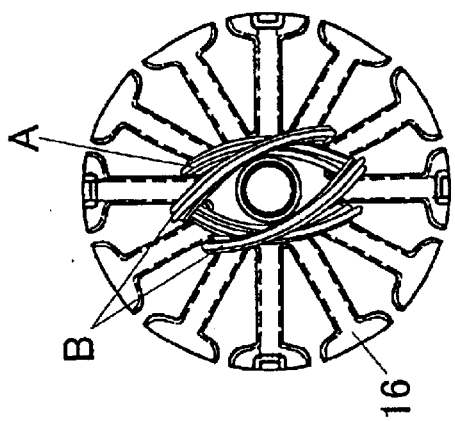
Figure 2C:
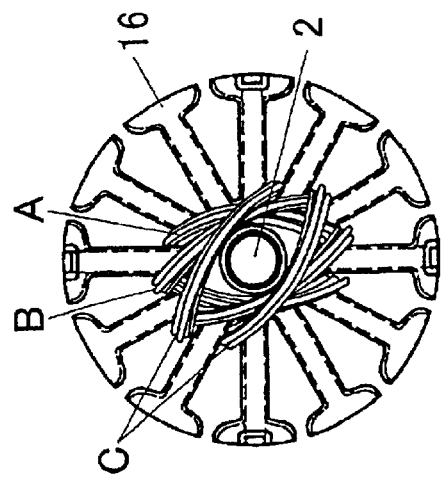
Figure 2D:
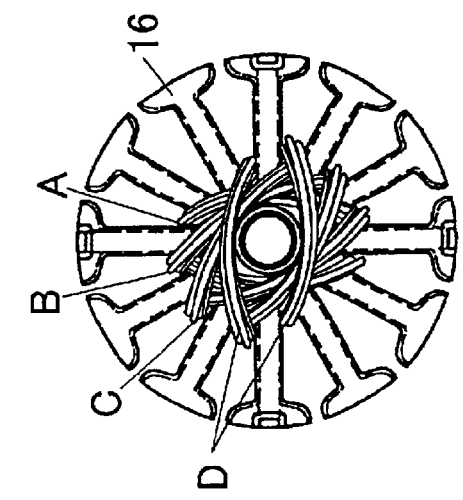
Figure 2E:
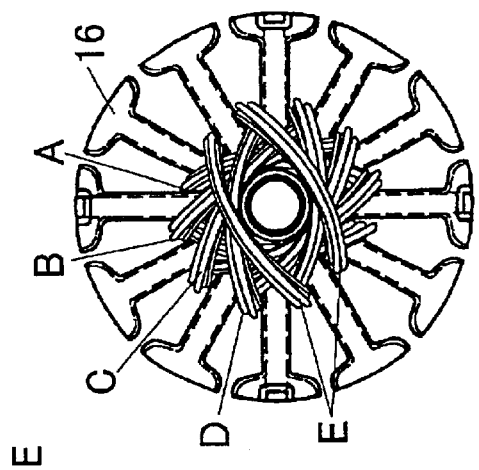
Figure 2F:
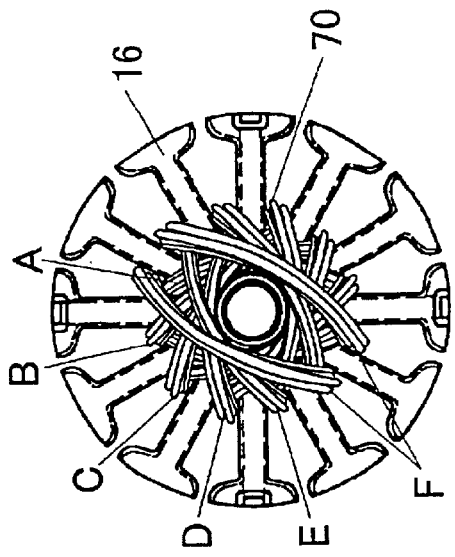

Next, as shown in FIG. 2B, the coil wire 5b is wound at a position shifted by one slot 12 in the counterclockwise direction according to the similar winding manner to the above to obtain a symmetrical coil pair B on the coil pair A. In this coil pair B, a total number of turns of the coil wire is 8 (4 turns between the slots). In other words, the coil wire 5b is wound so as to extend between the second slot and the seventh slot, and between the eighth slot and the first slot. This winding operation is repeated four times to obtain the symmetrical coil pair B.

By repeating the similar winding operation, as shown in FIGS. 2C to 2F, symmetrical coil pairs A, B, C, D, E, F are obtained on the iron core 10. In each of the coil pairs, a total number of turns of the coil wire is 8 (4 turns between the slots). These coil pairs are shifted from each other by 30 degrees in the circumferential direction, and overlap one another on the end surface of the iron core 10. Thus, the inner coil 70 is obtained. In this case, the position of the coil pair F corresponds to a winding end position of the coil wire 5b.

A diameter of the coil wire 5b used in this embodiment is 0.9 mm. Since the total number of turns of the coil wire is 8 in each of the coil pairs A to F, the total number of turns of the coil wire 5b in the inner coil 70 is 48 (=8×6 (pairs)). This inner coil 70 is designed on the assumption of operating the commutator motor by a DC power source of 24.5 A.

Figure 3A:
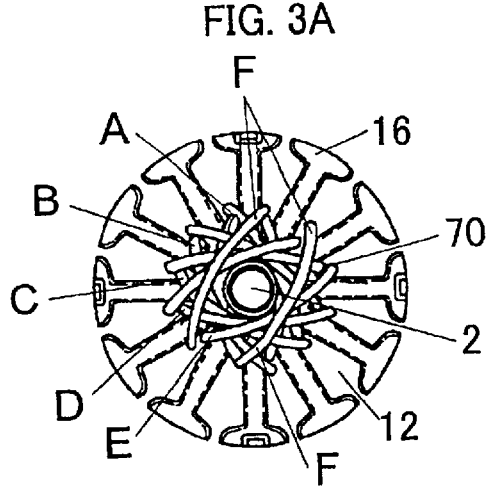
FIGS. 3A to 3C are schematic plan views illustrating a method of forming an outer coil of the commutator motor.
Figure 3B:
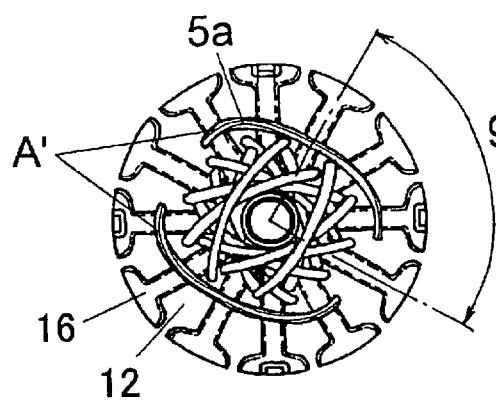
Figure 3C:
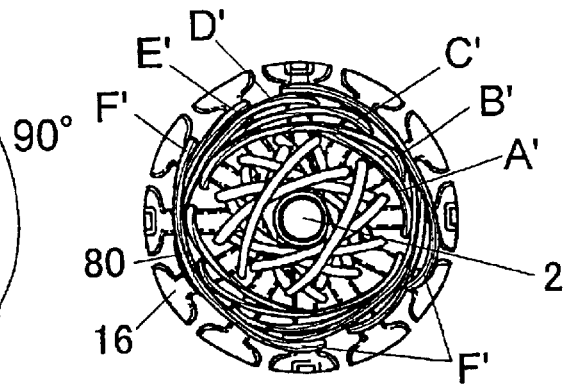

Next, a method of winding the coil wire 5a to form the outer coil 80 is explained. As shown in FIGS. 3A to 3C, the outer coil 80 of the commutator motor of this embodiment can be formed by winding the coil wire 5a in the slots 12 of the iron core 10. To facilitate understanding the method of winding the coil wire 5a, the coil pairs A to F of the inner coil 70 are briefly shown in FIGS. 3A to 3C.

A winding start position of the coil wire 5a is a position shifted in the circumferential direction by 90 degrees from the winding end position of the coil wire 5b, i.e., the position of the coil pair F. That is, as shown in FIG. 3B, the coil wire 5a is wound so as to extend between the second slot and the ninth slot, and between the third slot and the eighth slot. This winding operation is repeated 36 times to obtain a symmetrical coil pair A' on the iron core 10 at a peripheral region of the inner coil 70. In coil pair A', a total number of turns of the coil wire is 72 (36 turns between the slots).

Next, the coil wire 5a is wound at a position shifted by one slot 12 in a counterclockwise direction according to the similar winding manner to the case of the coil pair A'. That is, the coil wire 5a is wound so as to extend between the third slot and the tenth slot, and between the fourth slot and the ninth slot. This winding operation is repeated 36 times to obtain a symmetrical coil pair B' on the coil pair A'. In the coil pair B', a total number of turns of the coil wire is 72 (36 turns between the slots).

Figure 4:
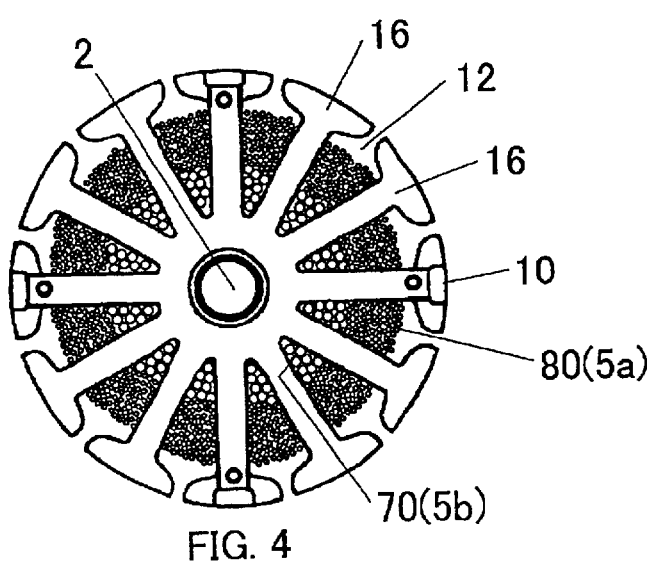
FIG. 4 is a cross-sectional view of a double winding structure of the commutator motor of the present invention.

By repeating this winding operation six times, as in the method of forming the inner coil 70 explained referring to FIGS. 2A to 2F, symmetrical coil pairs A', B', C', D', E', F' of the coil wire 5a are formed to obtain the outer coil 80, as shown in FIG. 3C. These coil pairs are shifted from each other by 30 degrees in the circumferential direction, and overlap one another on the end surface of the iron core 10. In this case, the position of the coil pair F' corresponds to a winding end position of the coil wire 5a. The cross-sectional structure of the formed inner and outer coils 70, 80 is shown in FIG. 4. In the slots 12 of the iron core 10, the inner coil 70 formed by the thick coil wire 5b is positioned at the center region, and the outer coil 80 formed by the thin coil wire 5a is positioned at the peripheral region.

A diameter of the coil wire 5a used in this embodiment is 0.28 mm. Since the total number of turns of the coil wire 5a is 72 in each of the coil pairs A' to F', the total number of turns of the coil wire 5a in the outer coil 80 is 432 (=72×6 (pairs)). This outer coil 80 is designed on the assumption of operating the commutator motor by an AC power source of 3.3 A with full-wave rectification.

When the inner and outer coils are formed as described above, it is possible to provide an equal motor characteristic in both cases of using the DC power source of 24.5 A and the AC power source of 3.3A.

In the commutator motor of the present invention, when supplying electric power from the DC power source such as a battery to the thick coil wire (Winding Number: Small) 5b of the inner coil 70, electric current flows in order of second terminal 30b→spring 20→brush 40b→commutator 3b→coil wire 5b. On the other hand, when supplying electric power from the commercial AC power source to the thin coil wire (Winding Number: Large) 5a of the outer coil 80, electric current flows in order of first terminal 30a→spring 20→brush 40a→commutator 3a→coil wire 5a. Therefore, a circuit for supplying the electric power to the coil wire 5a is independent from the circuit for supplying the electric power to the coil wire 5b.

In addition, since the winding start position of the coil wire 5a is the position shifted by 90 degrees about the iron core with respect to the winding end position of the coil wire 5b, it is possible to reduce sizes of a coil height H and a winding diameter ΦD, as shown in FIGS. 5A to 5C. It is particularly effective when downsizing the motor is needed. That is, according to the winding method mentioned above, it is possible to minimize the occurrence of waste space between the inner coil 70 and the outer coil 80, and to reduce the coil height H and the winding diameter ΦD.

In addition, when downsizing the commutator motor, there is an advantage of avoiding a situation that a part of the coil wire contacts the commutator by mistake. Therefore, when it is needed to keep the motor performance constant, the present invention can provide a downsized commutator motor. On the other hand, when it is needed to keep the motor size constant, the present invention can provide the commutator motor having improved motor performance.

In another embodiment of the present invention, a diameter of the coil wire 5b is 0.8 mm. In each of coil pairs of an inner coil, a total number of turns of the coil wire is 8 (4 turns between slots). A total number of turns of the coil wire 5b in the inner coil is 48 (=8×6 (pairs)). In this case, the inner coil is designed on the assumption of operating the commutator motor by a DC power source of 30.5 A.

On the other hand, a diameter of the coil wire 5a is 0.28 mm. In each of coil pairs of an outer coil, a total number of turns of the coil wire is 84 (42 turns between slots). A total number of turns of the coil wire 5a in the outer coil is 504 (=84×6 (pairs)). In this case, the outer coil is designed on the assumption of operating the commutator motor by an AC power source of 3.8 A with full-wave rectification. When the inner and outer coils are formed as described above, it is possible to an equal motor characteristic in both cases of using the DC power source of 30.5 A and the AC power source of 3.8 A.

In the present invention, as described above, a coil wire having a smaller diameter than the coil wire 5b is used as the coil wire 5a. In addition, the winding number of the coil wire 5a on the iron core is larger than that of the coil wire 5b. The thin coil wire 5a is easily heated, however, it can be effectively cooled by the cooling fan 14 because the coil wire 5a is wound at the peripheral side of the iron core. As a result, it is possible to avoid an increase in temperature of the coil wire 5a, and to prevent the coil wire from being burnt. Since the amount of heat generated on the thick coil wire 5b is small, no inconvenience is caused by winding the coil wire 5b at the center region of the iron core.

In consideration of providing an equal motor characteristic in both cases of using the DC power source of 12 V or 24 V and the commercial AC power source of 100 V or 240 V, and preventing the coil wire 5a from being burnt at overload, it is preferred that a cross section ratio of the coil wire 5a, 5b is coil wire 5a:coil wire 5b=1:2~30. In addition, it is particularly preferred that a diameter ratio of the coil wire 5a, 5b is coil wire 5a:coil wire 6b=1:1.5~6.

INDUSTRIAL APPLICAPABILITY

The commutator motor of the present invention has a double winding structure that can operate from either AC or DC power sources. Since a diameter of the coil wire of the outer coil of the double winding structure is smaller than the diameter of the coil wire of the inner coil, it is possible to improve the heat radiation effect. When the outer coil is cooled from outside, the cooling efficiency is further improved. In addition, there is an advantage of preventing the coil wire of the outer coil from being burnt at overload.

Since the commutator motor of the present invention provides improved safety and reliability of electric appliances such as vacuum cleaners, electric power tools and so on, its applications are expected.

What is claimed is:

1. A commutator motor, comprising:
   an iron core having a center and a plurality of open-ended teeth extending radially from the center to form a plurality of slots between the open-ended teeth, each slot configured for coil winding;
   a rotation shaft inserted in a center of said iron core;
   a pair of first and second commutators mounted on said rotation shaft at opposite ends of said iron core;
   a first coil wire connected to the first commutator, and wound on bottoms of the slots of said iron core to provide an inner coil to form a first winding, said first winding comprising a first subwinding around a first set of opposing open-ended teeth and a second subwinding around a second set of opposing open-ended teeth, the second set of opposing commutator teeth being adjacent to the first set of opposing open-ended teeth;
   a second coil wire connected to the second commutator, and wound on said inner coil in the slots of said iron core to provide an outer coil at a side of the opened outer radial end of the slot;
   a first terminal that can be connected to a first power source to supply electric power of said first power source to said first coil wire through said first commutator; and
   a second terminal that can be connected to a second power source to supply electric power of said second power source to said second coil wire through said second commutator;
   wherein a diameter of said second coil wire is smaller than that of said first coil wire.

2. The commutator motor as set forth in claim 1, wherein:
   a winding start position of said second coil wire of said outer coil is displaced at 90 degrees about said iron core with respect to a winding end position of said first coil wire of said inner coil.

3. The commutator motor as set forth in claim 1, wherein:
   said first terminal is adapted for use in a DC power source for supplying a large current that works as said first power source, said second terminal is adapted for use in an AC power source for supplying a small current that works as said second power source, and said inner and outer coils are formed such that a motor output provided by use of said first power source is substantially equivalent to the motor output provided by use of said second power source.

4. A commutator motor, comprising:

an iron core having a center and a plurality of open-ended teeth extending radially from the center to form a plurality of slots between the open-ended teeth, each slot configured for coil winding;

a rotation shaft inserted in the center of said iron core a pair of first and second commutators mounted on said rotation shaft at opposite ends of said iron core;

a first coil wire connected to the first commutator, and wound on bottoms of the slots of said iron core to provide an inner coil to form a first winding, said first winding comprising a first subwinding around a first set of opposing open-ended teeth and a second subwinding around a second set of opposing open-ended teeth, the second set of opposing commutator teeth being adjacent to the first set of opposing open-ended teeth;

a second coil wire connected to the second commutator, and wound on said inner coil in the slots of said iron core to provide an outer coil;

a first terminal that can be connected to a first power source to supply electric power of said first power source to said first coil wire through said first commutator;

a second terminal that can be connected to a second power source to supply electric power of said second power source to said second coil wire through said second commutator; and means for cooling said second coil wire, which is disposed at the periphery of said outer coil, wherein a diameter of said second coil wire is smaller than that of said first coil wire.

* * * * *